United States Patent
Fruzzetti et al.

(10) Patent No.: US 8,433,030 B2
(45) Date of Patent: Apr. 30, 2013

(54) CRYSTAL HABIT MODIFIERS FOR NUCLEAR POWER WATER CHEMISTRY CONTROL OF FUEL DEPOSITS AND STEAM GENERATOR CRUD

(75) Inventors: Keith Paul Fruzzetti, San Jose, CA (US); Karen Samie Kim, Palo Alto, CA (US); Robert Douglas Varrin, Jr., Reston, VA (US); Charles Marks, McLean, VA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 699 days.

(21) Appl. No.: 12/628,457

(22) Filed: Dec. 1, 2009

(65) Prior Publication Data
US 2010/0135450 A1   Jun. 3, 2010

Related U.S. Application Data

(60) Provisional application No. 61/118,862, filed on Dec. 1, 2008.

(51) Int. Cl.
*G21F 9/04* (2006.01)
*G21C 15/24* (2006.01)
*G21C 19/28* (2006.01)
*G21C 15/00* (2006.01)

(52) U.S. Cl.
USPC ........... 376/306; 376/277; 376/305; 376/308; 376/310

(58) Field of Classification Search ........... 376/305, 376/306, 308, 310, 277, 311–316, 409, 453, 376/454; 210/600, 660, 681–688
See application file for complete search history.

(56) References Cited

U.S. PATENT DOCUMENTS

| | | | | |
|---|---|---|---|---|
| 3,664,870 A | * | 5/1972 | Oberhofer et al. | 376/310 |
| 4,364,900 A | | 12/1982 | Burrill | |
| 4,395,335 A | * | 7/1983 | Saito | 376/313 |
| 4,415,457 A | * | 11/1983 | Shirosaki et al. | 210/682 |
| 4,559,171 A | * | 12/1985 | Hayashi et al. | 210/682 |
| 4,842,812 A | * | 6/1989 | Panson et al. | 376/306 |
| 4,894,202 A | * | 1/1990 | Nagase et al. | 376/306 |
| 4,975,201 A | * | 12/1990 | Ma | 210/686 |
| 5,126,100 A | * | 6/1992 | Bengel et al. | 376/305 |

(Continued)

FOREIGN PATENT DOCUMENTS

| | | |
|---|---|---|
| EP | 0 599 619 A1 | 6/1994 |
| KR | 10-2002-0075525 A | 10/2002 |
| KR | 10-2008-0035275 A | 4/2008 |
| KR | 10-0609590 B1 | 8/2008 |

OTHER PUBLICATIONS

PCT/US2009/006322—Written Opinion of the International Searching Authority, Jul. 8, 2010.
PCT/US2009/006322—International Search Report, Jul. 8, 2010.

(Continued)

*Primary Examiner* — Bernarr Gregory
(74) *Attorney, Agent, or Firm* — Curatolo Sidoti Co., LPA; Joseph G. Curatolo; Salavatore A. Sidoti

(57) ABSTRACT

Crystal habit modifiers (CHM) are provided to ameliorate deposit-related concerns in nuclear plant systems. The principal targets for utilization of crystal habit modifiers are Pressure Water Reactor (PWR) primary-side fuel rod crud and secondary-side steam generator deposits and Boiling Water Reactor (BWR) coolant system deposits.

13 Claims, 5 Drawing Sheets

U.S. PATENT DOCUMENTS

| | | | |
|---|---|---|---|
| 5,126,108 | A | 6/1992 | Leighton et al. |
| 5,154,197 | A | 10/1992 | Auld et al. |
| 5,171,515 | A | 12/1992 | Panson et al. |
| 5,377,245 | A * | 12/1994 | Uetake et al. ............ 376/305 |
| 5,715,290 | A * | 2/1998 | Uetake et al. ............ 376/306 |
| 5,864,596 | A | 1/1999 | Egerbrecht et al. |
| 6,228,950 | B1 | 5/2001 | Egerbrecht et al. |
| 6,379,612 | B1 | 4/2002 | Reizer et al. |
| 6,396,892 | B1 | 5/2002 | Frattini et al. |
| 6,430,249 | B2 | 8/2002 | Egerbrecht et al. |
| 6,436,154 | B1 | 8/2002 | Halverson et al. |
| 6,466,637 | B2 * | 10/2002 | Bowen et al. ............ 376/310 |
| 6,556,642 | B2 | 4/2003 | Hur et al. |
| 6,645,384 | B1 | 11/2003 | Richardson et al. |
| 6,718,002 | B2 * | 4/2004 | Rosengren et al. ......... 376/316 |
| 6,813,329 | B1 * | 11/2004 | Byers et al. ............ 376/454 |
| 6,885,721 | B2 | 4/2005 | Hur et al. |
| 6,891,912 | B1 * | 5/2005 | Lukic et al. ............ 376/305 |
| 2006/0215804 | A1 | 9/2006 | Yi et al. |
| 2007/0031280 | A1 | 2/2007 | Itzhak |
| 2008/0067129 | A1 | 3/2008 | Juenke et al. |
| 2008/0093584 | A1 | 4/2008 | Kwon et al. |
| 2009/0010377 | A1 | 1/2009 | Yi et al. |

OTHER PUBLICATIONS

Sugimoto, T., et al., "Formation of Uniform Sperical Magnetic Particles by Crystallization from Ferrous Hydroxide Gels", Journal of Colloid and Inteface Science, Mar. 1980, pp. 227-243, vol. 74, No. 1, United States.

Sapieszko, R.S., et al., "Preparation of Welll-Defined Colloidal Particles by Thermal Decomposition of Metal Chelates", Journal of Colloid and Interface Science, Apr. 1980, pp. 405-422, vol. 74, No. 2, Academic Press, Inc., Amsterdam, The Netherlands.

Regazzoni, A., et al., "Formation of Spherical colloidal Nickel Ferrite Particles as Model Corrosion Products", Apr. 1982, pp. 212-218, vol. 38, No. 4, National Association of Corrosion Engineers, United States.

Sarig, Sara, et al., "Size Reduction of Crystals in Slurries by the Use of Crystal Habit Modifiers", American Chemical Society, Jan. 1980, pp. 490-494, vol. 19, No. 3, American Chemical Society, United States.

Cho, Seung-Beom, et al., "Morphological Control of $Fe_3O_4$ Particles Via Glycothermal Process", Mar. 2007, pp. 4877-4886, vol. 42, J Mater Sci, United States.

Burukhin, A.A., et al., "Synthesis of Nanosized Ferrite Powder from Hydrothermal and Supercritical Solutions", Russian Journal of Inorganic Chemistry, 2001, pp. 646-651, vol. 46, No. 5, MAIK Nauka/Interperiodica, Russia.

Komarneni, Sridhar, et al., "Hydrothermal Preparation of Ultrafine Ferrites and Their Sintering", J. Am. Ceram. Society, Jan. 1988, pp. C-26-C-28, vol. 71, No. 1, American Ceramic Society, United States.

Mao, Baodong, et al., "Synthesis of Magnetite Octahedrons from Iron Powders Through a Mild Hydrothermal Method", Materials Research Bulletin, Apr. 2006, pp. 2226-2231, No. 41, Elsevier Science Publisher, Amsterdam, The Netherlands.

Hartman, P., "The Effect of Surface Relaxation on Crystal Habit: Cases of Corundum ($\alpha$-$Al_2O_3$) and Hematite ($\alpha$-$Fe_2O_3$)", Journal of Crystal Growth, 1989, pp. 667-672, vol. 96, Elsevier Science Publishers B.V., Amsterdam, The Netherlands.

Molinier, Michel, et al., "Biomimetic Control of Iron Oxide and Hydroxide Phases in the Iron Oxalate System", J. Chem. Soc., 1997, pp. 4061-4068, United Kingdom.

Couling, Suzanne B, et al., "The Influence of Inorganic Phosphate on the Crystallization of Magnetite ($Fe_3O_4$) from Aqueous Solution ", 1985. pp. 1713-1715, J. Chem. Soc., United Kingdom.

McGarvey, G.B., et al., "Copper (II) Oxide as a Morphology Directing Agent in the Hydrothermal Crystallization of Magnetite", Journal of Materials Science, 1996, pp. 49-53. vol. 31, Springer, United States.

Iijima, Motoyuki, et al., "Microstructure Control of Iron Hydroxide Nanoparticles Using Surfactants with Different Molecular Structures", Journal of Colloid and Interface Science, 2006, pp. 202-208, vol. 298, Elsevier Science Publishers B.V., Amsterdam, The Netherlands.

Bénézeth, Pascale, et al., "Effect of Amines on the Surface Charge Properties of Iron Oxides",International Conference Interaction of Organics and Organic Cycle Treatment Chemicals with Water, Steam, and Materials, 2006, pp. 132-136, vol. 8, No. 3, Power Plant Chemistry GmbH, Lucerne, Switzerland.

Lee, W.S., et al., "Phase Transformation and Microstructure in (Mg, Ti)-PSZ", Journal of Materials Science, 1991, pp. 4561-4566, vol. 26, Chapman and Hall, United States.

Van Rosmalen, G.M., et al., Characterization of Additive Performance on Crystallization: Habit Modification, Journal of Cryatal Growth, 1990, pp. 1053-1060, vol. 99, Elsevier Science Publishers B.V., Amsterdam, The Netherlands.

Wang, B.G. et al., "Understanding and Controlling the Morphology of ZnO Crystallites under Hydrothermal Conditions", Journal for Experimental and Industrial Crystallography. . 1997, pp. 659-667, vol. 32, No. 5, Crystal Research and Technology, Germany.

Partridge, Michael J., "Titanium Dioxide Application Gudelines", Technical Report, Nov. 1997, pp. iii-A-2, Dominion Engineering, Inc., McLean, Virginia.

Misawa, T., et al., "The Mechanism of Formation of Iron Oxide and Oxyhydorxides in Aqueous Solutions at Room Temperature", Corrosion Science, 1974, vol. 14, pp. 131-149. Pergamon Press Great Britain.

Vayssiéres, Lionel, el al., "Size Tailoring of Magnetite Particles Formed by Aqueous Precipitation: An Example of Thermodynamic Stability of Nanometric Oxide Particles", Journal of Colloid and Interface Science, 1998, pp. 205-212, Article No. CS985614, Academic Press.

Zaitseva, N., et al., "Habit control During Rapid Growth of KDP and DKDP Crystals", Journal of Crystal Growth, 2002, 363-373, vol. 241, Elsevier, Science B.V., Amsterdam, The Netherlands.

* cited by examiner

CRYSTAL HABIT MODIFIERS FOR NUCLEAR POWER WATER CHEMISTRY CONTROL OF FUEL DEPOSITS AND STEAM GENERATOR CRUD

CROSS REFERENCE TO RELATED APPLICATIONS

This application claims the benefit of U.S. Provisional Application for Patent Ser. No. 61/118,862, filed Dec. 1, 2008 pursuant to 35 U.S.C. §119(e), which application is incorporated herein by reference.

TECHNICAL FIELD

Crystal habit modifiers are applied to the nuclear power plant reactor coolant system and/or steam generation water chemistry to modify the structure of corrosion product deposits on fuel and steam generator surfaces.

BACKGROUND

The Pressurized Water Reactor (PWR) 100, shown as FIG. 1, is the most common type of nuclear power generating reactor, with over 230 in use for power generation and a further several hundred in naval propulsion. It uses ordinary water as both coolant 118 and moderator 116. The design is distinguished by having a primary cooling circuit 102 which flows through the core 110 of the reactor 100 under very high pressure, and a secondary circuit 104 in which steam 114 is generated to drive the turbine generator 106. The core 110 and primary cooling circuit 102 are contained within a concrete containment structure 101.

A PWR 100 may have fuel assemblies 120 of 200-300 rods 108 each, arranged vertically in the core 110, and a large reactor may have about 150-250 fuel assemblies 120 with 80-100 tons of uranium. Water in the reactor core reaches about 325° C., hence it must be kept under about 150 times atmospheric pressure to prevent it from boiling. Pressure is maintained by steam in a pressure vessel 112. In the primary cooling circuit 102, which is circulated via primary-side pump 124, the water is also the moderator 116, and if any of it turned to steam the fission reaction would slow down. This negative feedback effect is one of the safety features of this type of reactor. The secondary shutdown system (not shown) involves adding boron to the primary circuit 102.

The secondary circuit 104 is under less pressure and the water there, being in thermal contact with the primary circuit 102, boils in the heat exchangers (not shown) within the steam generator 122. The steam drives the turbine generator 106 to produce electricity, and is then condensed and returned via a secondary-side pump 126 to the heat exchangers (not shown) within the steam generator 122.

Referring now to FIG. 2, the Boiling Water Reactor (BWR) 200 has many similarities to the PWR, except that there is only a single circuit 204, which passes through the concrete containment structure 202, in which the water is at lower pressure (about 75 times atmospheric pressure) so that it boils in the core 210 at about 285° C. The reactor 200 is designed to operate with 12-15% of the water in the top part of the core 210, which is housed within a pressure vessel 212, as steam 214, and hence with less moderating effect and efficiency than the PWR. The steam 214 passes through drier plates 228 (steam separators) above the core 210 and then directly to the turbines 206, which are thus part of the reactor circuit 204. The reactor circuit 204 also includes a core-circulating pump 224 to circulate the boiling water in the pressure vessel 212, and a recycle pump 226 which returns condensed steam 214 that has passed through the turbine 206 back to the pressure vessel 212.

A BWR fuel assembly 220 comprises 90-100 fuel rods 208, which are secured by control rods 230, and there are up to 750 assemblies 220 in a reactor core, holding up to 140 tons of uranium. The secondary control system (not shown) involves restricting water flow through the core so that steam in the top part means moderation is reduced.

During operation of a nuclear power reactor, impurities and products of the reactor coolant are deposited on nuclear fuel assemblies. These deposits can impact operation and maintenance of nuclear power plants in a number of ways; for example, (a) their neutronic properties can adversely affect the nuclear performance of the reactor: (b) their thermal resistance can cause elevated surface temperature on the fuel rods that may lead to material failure in the rod; (c) their radioactive decay results in work radiation exposure when they are redistributed throughout the reactor coolant system, in particular during power transients; (d) they complicate thorough inspection of irradiated nuclear fuel assemblies by both visual and eddy current methods; (e) deposits released from fuel rods tend to reduce visibility in the spent fuel pool, significantly delaying other work in the fuel pool during refueling outages; (f) once reloaded into the reactor on assemblies that will be irradiated a second or third time, they form an inventory of material that can be redistributed onto new fuel assemblies in a detrimental manner.

Axial offset anomaly (AOA) has been reported in pressurized water reactors (PWRs). AOA is a phenomenon in which deposits form on the fuel rod cladding due to the combination of local thermal-hydraulic conditions and primary-side fluid impurities characteristic of the reactor and the primary system. These deposits cause an abnormal power distribution along the axis of the core, reducing available margin under certain operating conditions. AOA has forced some power plants to reduce the reactor power level for extended periods.

Primary-side crud deposits are compositionally complex, containing four common constituents; nickel ferrite, nickel, nickel oxide, and zirconium oxide. Secondary circuit deposits consist primarily of magnetite ($Fe_3O_4$), with lesser concentrations of copper, zinc (as an oxide spinel or as the oxide), nickel (as the oxide or as nickel ferrite), and a host of minor mineral species that typically represent less than 2-3% of the deposit (by weight). These mineral species contain, among other elements, aluminum, silicon, calcium, magnesium, and manganese. Iron oxide is the predominant metal oxide contained in the metal-oxide/sludge formed in the secondary circuit nuclear steam generator.

The consequences resulting from the buildup of metal oxides within the secondary side of a steam generator are reduced steam output, thereby resulting in lost electrical output from the generating plant, increased water level fluctuations within the steam generator thereby resulting in lower steam and electrical output, and the initiation of corrosion deposits within the heat exchanger through the concentration of the dissolved chemical species from the secondary water. The corrosion within the secondary side of a pressurized nuclear steam generator ultimately may result in tube plugging and sleeving and the eventual loss of electrical output because of lost heat transfer or flow imbalances unless the steam generators themselves are replaced.

The deposits which form on both core and ex-core surfaces in the primary systems of nuclear plants, as well as on the secondary side of steam generators, are largely composed of crystalline solids. A crystalline material is one form of solid which exhibits a regularly ordered array of atoms in a lattice structure. Other solids which may exist in crud and deposits are amorphous (potentially some silicates or glass like species), and possibly some hydroxides or gel-like species. However, the vast majority of deposits are crystalline.

The deposits that adhere to surfaces on the primary and secondary side are thought to form by a number of mechanisms, including: (1) crystallization of soluble species from the coolant, (2) attachment of particulates that have been formed within the reactor coolant or secondary plant systems, or been introduced from outside the plant as impurities, (3) local transformation of existing deposits, and (4) oxidation or corrosion of the parent, underlying surface.

The process of crystallization involves two fundamental steps: (1) initial nucleation of a solute at a surface or within the solution, followed by (2) ongoing crystal growth by adsorption and incorporation of solute molecules at the crystal surfaces. The presence of a solute in a solution at concentrations above equilibrium ("super saturation") is a major driving force for nucleation initiated crystallization, but crystallization can also occur from solutions that are not saturated if the formation of a solid phase, such as at a surface, is thermodynamically favorable. The external shape of a crystal is known as the crystal habit. Usually, crystal growth leads to the formation of crystal aggregates rather than single crystals, and the habit represents the appearance of the aggregate.

Crystal habit modifiers (CHM) are chemical additives that change the habit, or the shape, of crystals and in turn affect the behavior and properties of the crystals and crystal aggregates. CHMs are commonly used in the chemical industry to produce products with desirable crystalline structure, morphology, density, particle size, or surface area.

Many conventional crystal habit modifiers used in the chemical and pharmaceutical process industries may not be readily applied to a PWR plant environment, as they are incompatible with nuclear plant operations and chemistry specification limits.

Currently, the control of corrosion product deposition involves the minimization of the transport of corrosion products to fuel and steam generator (SG) surfaces and the mitigation of the deposition of corrosion products on fuel and SG surfaces. For example, dispersants are currently added to PWR secondary side water chemistry to mitigate the deposition of corrosion products on SG surfaces. No chemical additive or other technologies exist for positively modifying the crystalline structure of the fuel and SG deposits.

DETAILED DESCRIPTION

Figure 1:
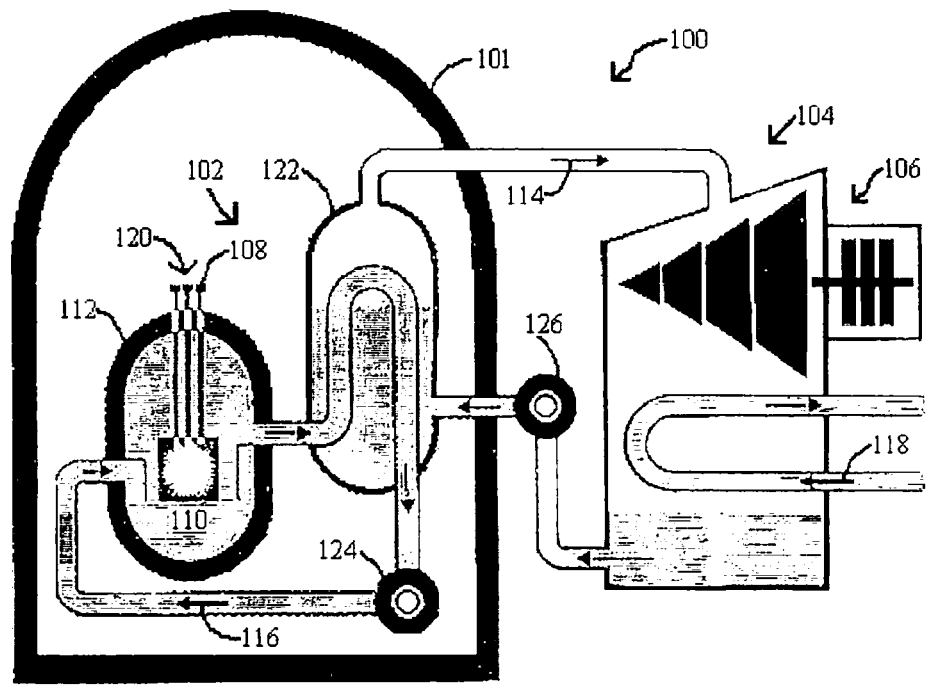
FIG. 1 is a schematic representation of a Pressure Water Reactor, showing the primary side and secondary side systems.
Figure 2:
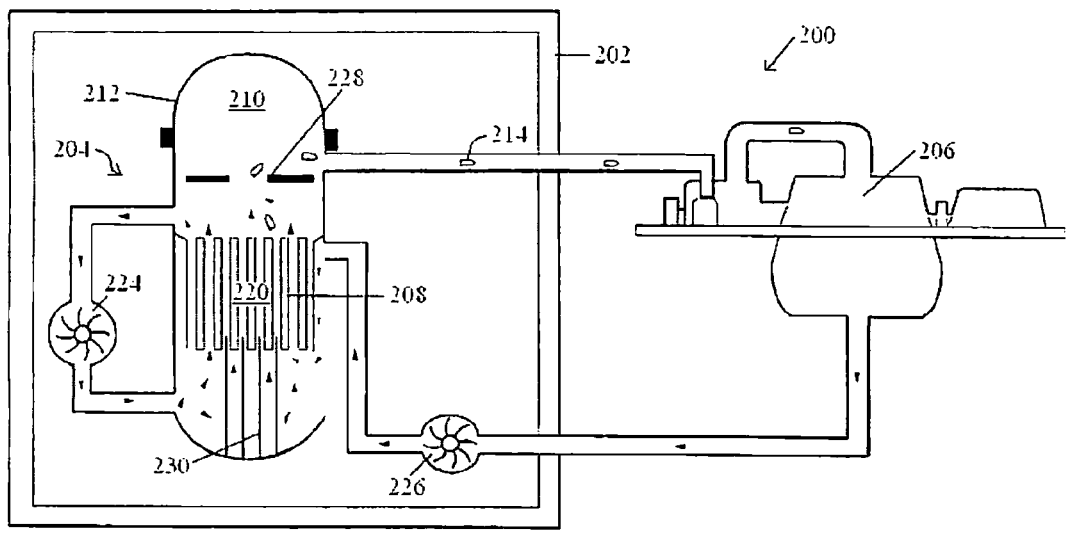
FIG. 2 is a schematic representation of a Boiling Water Reactor.

Crystal habit modifiers (CHM) are provided to ameliorate deposit-related concerns in nuclear plant systems. The principal targets for utilization of CHMs are Pressure Water Reactor (PWR) primary-side fuel rod crud and secondary-side steam generator deposits.

Modifying the morphology or composition of fuel rod crud is designed to mitigate axial offset anomaly (AOA), and changing the structure of steam generator tube deposits addresses issues related to heat transfer reduction or fouling. CHM additives may also be used to affect deposits on ex-core surfaces in the primary system (such as on the inner diameter of steam generator tubes), or in the final stages of the feedwater and condensate systems in the secondary side of the plant.

The control of crystal habit, composition or structure may be achieved by adding a CHM agent, changing the concentration of species that are currently dictating crystal habit, or adding more than one species (such as a CHM and a deposit precursor or "template" that acts in a desired manner with the CHM). In any case, the deposit precursor may be added at low concentration (typically in the parts per trillion range, optionally the ppb or low ppm range) to avoid the formation of an unacceptable amount of deposit regardless of a favorable structure or habit characteristic. An example is adding a CHM in concert with species such as zinc or titanium. In other embodiments, a higher concentration of CHM may be sufficient to beneficially alter the crystal habit of the deposit.

The mitigation of deposit or crud-related phenomena may be accomplished through the addition of CHMs by at least one of:

Changing the habit of crystals during particulate growth in the fluid phase (prior to particulate deposition).

Changing the habit of crystalline deposits that form from dissolved species or colloidal particulates at heat transfer and non-heat transfer surfaces.

Changing the habit of existing deposits as they ripen due to partial release, internal densification, solubilization and re-deposition.

Changing the porosity, specific surface area, or concentration of active adsorption sites for ionic species (such as iron, cobalt, nickel or boron).

Reducing or increasing the crystal surface structure so as to change the activation energy and energy of adsorption of ionic species.

Changing the net particle charge or potential, which in turn affects the deposition, agglomeration, or release of particulates.

Changing the rate of crystal growth.

Changing the susceptibility of the crud or deposits to removal by chemical or mechanical means through tailoring the crystal habit.

Changing the chemical composition of the deposits by adding a CHM that promotes formation of one (or more) species as compared to others.

Primary side chemistry is purer than that on the secondary side, in that tramp impurities, such as silica, calcium, and magnesium compounds are largely absent. The complexity of the deposit chemistry, the relative absence of dissolved tramp impurities, and the shorter lifespan of the materials supporting the deposits render primary-side deposits more amenable to modification than are secondary-side deposits. This is balanced by the potential for increased radiological concerns associated with any primary-side chemistry modification.

The presence of AOA requires that a boron compound be present as a crud constituent. Typically, bonaccordite ($Ni_2FeBO_5$) is found in crud depositions associated with AOA. The boron adsorption capacity at primary plant temperatures is a very strong function of the local boron concentration. This adsorption is likely a precursor to the observed bonaccordite formation. Consequently, AOA occurrence is likely a direct consequence of a substantial increase in the deposit concentration capability, by one of a number of possible mechanisms including partial exfoliation and under deposit concentration, or increasing thickness and population of adsorption sites. In either case, the adsorption of boron may increase with increasing deposit mass, decreasing or increasing porosity, and potentially increased specific surface area. Each of these is affected by the crystal habit.

While modifying the crystal habit may reduce the mass of the deposit, it is more likely to affect the porosity and specific surface area, and hence the number of potential adsorption sites. Significant variation occurs in the deposit morphology, attendant on changes in the boiling rate and the chemistry specification. The boiling rate affects the balance between precipitated and deposited constituents. Since each constituent has a characteristic habit, the morphology is affected. In plants experiencing AOA, there have been identified large variations in the deposit crystal shapes, with regions containing a preponderance of rod-like crystals having a higher porosity.

Preserving a higher porosity should prevent the deposit from becoming more structurally sound, increasing the likelihood of it being spalled from the fuel by bulk fluid. However, higher porosity in total may correspond to higher specific surface area which could increase the number of sites for boron adsorption and incorporation into the crud films.

Modifying the crystal habit may have a similar effect on secondary-side deposits. The propensity for developing heat transfer fouling may be limited by reducing the rate at which the porosity decreases as a result of precipitating dissolved corrosion products. Maintaining adequate heat transfer requires that the deposit remain well-irrigated with bulk fluid. The transport of bulk fluid into the deposit and the exiting of steam and excess bulk fluid are strong functions of the deposit porosity and pore size distribution. While crystallization occurs on the nano-scale and the deposit geometry is maintained on a micron-scale, modifying the habit may increase the available pore volume for convection flow of liquid water through the deposit and escape of steam out of the deposits (through "chimneys"). As with primary-side deposits, preserving a higher porosity should also limit deposit strengthening with ongoing operation in secondary side deposits.

Secondary-side deposits that have similar thickness may have substantially differing porosity. This difference may be the result of differing relative contributions from particulate and dissolved corrosion products. These deposits are often substantially thicker than are primary-side deposits, reaching a thickness of about 300 microns, compared to about 40 microns for primary side deposits. They may also be resident for the life of steam generators, rather than for the three fuel cycles typical of a primary deposit. Consequently, secondary-side deposits may be subject to more extensive porosity reduction resulting from precipitation of soluble corrosion products than are primary deposits.

While primary and secondary deposits have radically different compositions and thickness, they are subject to different thermal and hydraulic conditions, and exist for very different operational time periods, the problems associated with their presence are caused by similar phenomena. That is, the deposit density and pore structure change over time, leading in one case to the concentration and accumulation of boron compounds; and in the other, to local flow starvation and deterioration in the heat transfer. To the extent that crystal habit modification reduces undesirable changes in deposit structure such as porosity, it can serve to mitigate both concerns.

In one embodiment, crystal habit is changed by making a small change in either the pH or the potential within existing primary side or secondary side chemistry specifications.

Many crystalline solids can form with many different habits, with multiple habits sometimes existing within single samples of a material. The crystal habit is often affected by the presence of two or more competing crystalline structures within the same mass of solid, by crystal twinning (the intergrowth of two crystals leading to a slight misorientation of the crystals), by growth conditions (heat, pressure, available space, super-saturation), and, significantly, by impurities present during crystal growth even in very small quantities. All of these factors can affect the size as well as the shape of the crystals that grow from solutions.

Magnetite ($Fe_3O_4$), the dominant secondary-side deposit constituent, has a combination of cubic, octahedral, and dodecahedral faces, with the dominant habit believed to be a cubo-octahedron. With three crystal shapes possible, modifying the environment under which the magnetite is formed may affect the heterogeneity of the deposit. Nickel-ferrite has the same habit as magnetite. Metallic-based zirconium oxide (as opposed to the ceramic form) has a monoclinic structure. Nickel has a cubic close-packed crystal structure. Further, there is clearly a unique habit displayed by some crud deposits that may be influenced by intentional introduction of a CHM.

The process of crystallization involves adsorption of solutes at growing crystal surfaces or planes. The adsorption of impurities (such as an intentionally added CHM) on crystal surfaces substantially changes the average binding force between the particles in the surface layer. Accordingly, the introduction of an impurity may lead to a transition in the nature of the crystal growth, for example from an atomically rough surface to a smooth one, or vice versa, due to adsorption of impurities in the form of atoms, molecules, complexes, or aggregates in different positions on the surface, such as kinks (defects), steps (terraced ledges in the crystal face), or atomically smooth areas of the crystal face.

In some embodiments, the adsorbed species blocks addition of molecules of the crystallizing species to the crystal structure at that location. Thus, impurities or CHMs may reduce the growth rates of the crystal faces. Since kink (defect) density is much higher on atomically rough surfaces than on layerwise smooth growing surfaces, the amount of impurity necessary to poison kinks and retard growth is much lower in the case of layer growth. Once adsorbed on the surface, impurities change not only the growth rate and the habit of the crystal as a whole, but also the morphology of the layerwise-growing faces. If the adsorption energy is sufficiently high, the amount of impurity on the surface may not be small, even if its concentration in the bulk is low. Epitaxial crystallization of the impurity itself may then begin on the surface, and the growth of the principal crystal may come to a complete stop.

In other embodiments, impurities may interfere with the formation of nuclei as well as with the growth of nuclei, and they can cause anomalies in the dependence of the growth rate on the temperature.

In some embodiments, crystal habit modifiers change the size rather than, or in addition to, the shape of the crystal.

Magnetite, $Fe_3O_4$ or $Fe(II)Fe(III)_2O_4$, contains iron in two oxidation states. As discussed above, magnetite is the principal species found in secondary side steam generator deposits. As a result of its two oxidation states, the morphology of magnetite is sensitive to the redox characteristics of the environment in which it is produced. Properties of magnetite, strongly depend on the morphology and size of its crystals. Control of the physicochemical conditions of precipitation, particularly the acidity and ionic strength in the absence of complexing species, permits control of the size and morphology. The variations in size and shape are closely related to variations in the electrostatic charge density on the surface of particles, which induce changes of the oxide/solution interfacial tension, and, consequently, a decrease in surface energy. Such an effect permits control of the surface area of the system.

Cubic and octahedral magnetite morphology is strongly dependent on their chemical composition. The presence of cations which favor occupancy of the "A" site in the spinel structure of magnetite is significant in the formation of cubic magnetite at concentrations of x=0.02 in the formula $Zn_xFe_{3-x}O_4$, with unusual order-disorder phenomena accompanying this change in habit. The presence and absence of a template molecule can influence the crystal morphology, the oxidation state of iron, and the nature of phase formed.

Crystal habit modifiers (CHMs) such as (1) titanium dioxide, (2) phosphates and phosphonates, (3) acrylates (breakdown products of existing dispersants), (4) trivalent cations ($Al3+$, $Mn3+$), (5) borates, (6) polyacrylic acid, (7) cerium acetate, (8) potassium, and (9) maleic acid may be added to the primary or secondary circuits of a pressurized water reactor (PWR) or to boiling water reactor (BWR) coolant as a means of controlling the crystal habit that comprise primary and secondary side corrosion product deposits. Other species suitable for nuclear power plant water chemistry control include silicates, aluminates and nickel species.

By controlling the habit of the depositing crystals, one may retard deposit formation, produce deposits with desirable properties (e.g., high friability, low or high porosity), or promote a preferred chemical composition. Typically applied at very low concentrations relative to the concentration of the ionic species that are being crystallized. CHMs may alleviate problems associated with deposits in nuclear plants including axial offset anomaly (AOA), steam generator fouling and under-deposit corrosion.

These chemicals can be modified or controlled to be applied as CHMs in primary or secondary coolant systems. For example, molar concentrations of $TiO_2$, that have been proposed to modify the surface chemistry of base materials (stainless steel, nickel alloys) that are dissimilar to deposit constituents, may unexpectedly have an analogous effect on corrosion product deposits, especially if they are added in ppb concentrations as solids with a controlled structure, after which they may act as a template for growing crud or deposits.

Cerium species ($Ce3+$) at 16 ppm at ceramic-formation temperatures (1600° C.) modified the habit of potassium hydrogen phthalate. A small chemistry change may have a disproportionate effect on the deposit structure.

Phosphate compounds may change the crystal habit of magnetite, a major constituent of secondary site SG crud deposits. Significant changes in the magnetite crystal habit have been observed as the phosphate concentration is increased from zero to about 10% and then to about 30%.

Significant morphological changes were evident in plant primary-side deposits following zinc addition. The chief observation was a significant reduction in the deposit thickness compared to that found in previous cycles. Conceivably, the zinc addition could have weakened the deposit, causing it to be more readily spalled from the fuel. The remaining zinc was incorporated into the ferrite matrix, rather than being present as a separate constituent.

The capability to modify the crystal habit of the deposit constituents is a function of the distribution of particulate, colloidal, and soluble corrosion products entering the deposit as well as of changes in the chemistry attendant on the boiling processes within the deposit. This is particularly important for the primary side corrosion products since iron and nickel have very different solubility limit variations with pH, temperature, and potential. The iron solubility increases with increasing pH, while the nickel solubility decreases; the iron solubility increases with increasing potential, while the nickel solubility decreases. The iron solubility is weakly temperature dependent, while the nickel solubility variation with temperature changes considerably as a function of potential.

Comparison of the bulk concentrations reported for several plants suggests that iron is primarily in solution as it enters the deposit, with some particulate, but no colloidal material. The iron will then precipitate, both because of the potential increasing due to hydrogen stripping and concentration increasing due to evaporation or boiling. Conversely, nickel is primarily in colloidal form as it enters the crevice. Consequently, a CHM intended to act on magnetite may need to be active inside the deposit, while a CHM intended to act on nickel may be more effective if it were active in the bulk. Depending upon the characteristics of the selected CHM, it may be appropriate to vary the pH or potential.

Nickel oxide and zinc oxide both have habits that are quite different from the nickel ferrite habit. Given the low nickel solubility, and the strong variation in nickel solubility as a function of potential, the fraction of nickel entering the deposit in either colloidal or soluble form may vary with the potential. The morphology of deposits formed by locally precipitated nickel or nickel oxide may differ from that formed by the accumulation of colloidal nickel, leading to a weaker deposit.

EXAMPLES

Experimentation was conducted to investigate the effect of CHMs on a typical secondary system deposit material, iron oxide in the form of magnetite ($Fe_3O_4$). To capture the range of temperatures experienced in the secondary system, methods of synthesizing magnetite at low temperatures (90° C.) and high temperatures (250° C.) were adapted to screen CHM candidates for deposit modification.

The crystal size and morphology of the deposit material formed was evaluated using scanning electron microscopy (SEM). X-ray Diffraction (XRD) and infrared (IR) spectroscopy were used to establish the nature and purity of the product. These analyses also provided a general idea of grain size, as very small particles generate broader peaks. Magnetic sweeping was used as a rapid and general indicator of the presence of magnetite.

Crystal habit modifier screening tests were conducted at 90° C. to simulate conditions in the secondary circuit of a PWR during start-up and in areas of the condensate and feedwater systems. The screening tests conducted are shown in Table 1. The tests were conducted under the low temperature procedure described in Sugimoto, T, and E. Matijević, "Formation of Uniform Spherical Magnetite Particles by Crystallization from Ferrous Hydroxide Gels", Journal of Colloid and Interface Science, Vol. 74, No. 1, March 1980. pp. 227-243, incorporated by reference herein. After magnetite was reproducibly synthesized according to this procedure, the CHM screening tests were performed.

The results of these experiments are given in Table 2. Example T8A had the greatest degree of uniformity and the largest crystal size (~0.3 μm). The chemical conditions established in Example T8A were therefore repeated in the CHM screening tests. Test IDs 10 through 23. In these tests, a CHM was added to the test solution just prior to heating.

The following method was used to synthesize masmetite ($Fe_3O_4$) through aging ferrous hydroxides at 90° C. The reaction vessels were heated to approximately 90° C. using a thermostat circulating bath and jacketed glass reaction systems. Approximately 150 ml of deionized water was deaerated in advance using $N_2$ gas. A solution containing the desired concentration of ferrous sulfate was prepared by quickly dissolving the specified quantity of ferrous sulfate heptahydrate ($FeSO_4.7H_2O$) in 70 ml of deaerated water. This solution was immediately transferred into the reaction vessel, which was continuously purged with $N_2$ at a flow rate of about 300 ml/min. The solution in the reaction vessel was stirred to ensure homogenous mixing.

A solution containing the specified amount of potassium hydroxide (KOH) and potassium nitrate ($KNO_3$) in 30 ml of deaerated water was prepared and transferred into a dripping funnel. This solution was added drop-wise into the reaction vessel over a period of approximately 5 minutes with continuous stirring. Stirring was discontinued once the addition was complete, at which point the $N_2$ flow rate was decreased to 150 ml/min. The reaction vessel was maintained at 90° C. for 1 hr with $N_2$ sparging at flow rate of 150 ml/min. In Test ID 9A, a longer hold period at 90° C. was used.

The reaction was stopped by cooling the temperature of the reaction mixture to 25° C. and decreasing the $N_2$ flow to 70 ml/min. The following day, the resulting solution was filtered through a membrane filter (Millipore, 0.45 μm pore size). The pH of the filtrate was measured. The precipitate on the filter paper was rinsed with approximately 15-25 ml of deionized water. The washed precipitate was then dried in a vacuum oven at room temperature. The dried precipitate was subsequently weighed and characterized by means of XRD, FTIR, optical microscopy, and SEM. Qualitative magnetic screening was performed by bringing the sample close to an Nd—B—Fe magnetic bar and observing the response.

TABLE 1

Test Matrix of Crystal Habit Modifier Screening Tests Performed at Low Temperature (90° C.)

| Test ID | Oxide Name, Reaction System | T (° C.) | Reagent Conc. (M) FeSO₄ | KOH | KNO₃ | Excess [Fe²⁺] M | Excess [OH] M | CHM Species | mM |
|---|---|---|---|---|---|---|---|---|---|
| T1 | Oxide: Fe₃O₄ | 90 | 0.360 | 1.000 | 0.080 | — | 0.3 | — | — |
| T2 | (Magnetite) | 90 | 0.360 | 1.000 | 0.080 | — | 0.3 | — | — |
| T3 | Reaction | 90 | 0.499 | 1.000 | 0.080 | — | — | — | — |
| T4 | System: 200 ml | 90 | 0.167 | 0.333 | 0.027 | — | — | — | — |
| T5 | Glass Vessel | 90 | 0.333 | 0.333 | 0.027 | 0.2 | — | — | — |
| T6 | | 90 | 0.050 | 0.100 | 0.009 | — | — | — | — |
| T7 | | 90 | 0.025 | 0.051 | 0.004 | — | — | — | — |
| T8 | | 90 | 0.125 | 0.051 | 0.004 | 0.1 | — | — | — |
| T7A | | 90 | 0.025 | 0.051 | 0.200 | | — | — | — |
| T8A | | 90 | 0.126 | 0.051 | 0.200 | 0.1 | — | — | — |
| T9 | | 90 | 0.225 | 0.051 | 0.200 | 0.2 | — | — | — |
| T9A[a] | | 90 | 0.225 | 0.051 | 0.200 | 0.2 | — | — | — |
| T8A#2[b] | | 90 | 0.125 | 0.051 | 0.200 | 0.1 | — | — | — |
| T10 | | 90 | 0.126 | 0.051 | 0.200 | 0.1 | — | Phosphonate (HEDP) | 1.3 |
| T10[b] | | 90 | 0.125 | 0.051 | 0.200 | 0.1 | — | Phosphonate (HEDP) | 1.3 |
| T11 | | 90 | 0.125 | 0.051 | 0.200 | 0.1 | — | Sodium Oxalate | 1.3 |
| T12 | | 90 | 0.125 | 0.051 | 0.200 | 0.1 | — | Formic Acid | 1.3 |
| TT13 | | 90 | 0.125 | 0.051 | 0.200 | 0.1 | — | Sodium Salicylate | 6.2 |
| T14[c] | | 90 | 0.125 | 0.051 | 0.200 | 0.1 | — | — | — |
| 15[d] | | 90 | 0.125 | 0.051 | 0.200 | 0.1 | — | Boric Acid | 6.3 |
| T16 | | 90 | 0.125 | 0.051 | 0.200 | 0.1 | — | EDTP | 6.0 |
| T17 | | 90 | 0.125 | 0.052 | 0.200 | 0.1 | — | EDTA-TMAH | 6.3 |
| T18 | | 90 | 0.125 | 0.051 | 0.200 | 0.1 | — | Sodium Aluminum Oxide | 6.4 |
| T15A | | 90 | 0.125 | 0.051 | 0.200 | 0.1 | — | Boric Acid | 6.3 |
| T19 | | 90 | 0.125 | 0.051 | 0.200 | 0.1 | — | Sodium Oxalate | 6.0 |
| T20 | | 90 | 0.125 | 0.051 | 0.200 | 0.1 | — | Boric Acid | 12.6 |
| T21 | | 90 | 0.125 | 0.051 | 0.200 | 0.1 | — | Formic Acid | 8.0 |

TABLE 1-continued

Test Matrix of Crystal Habit Modifier Screening Tests Performed at Low Temperature (90° C.)

| Test ID | Oxide Name, Reaction System | T (° C.) | Reagent Conc. (M) FeSO$_4$ | KOH | KNO$_3$ | Excess [Fe$^{2+}$] M | Excess [OH] M | CHM Species | mM |
|---|---|---|---|---|---|---|---|---|---|
| T22 | | 90 | 0.125 | — | 0.200 | 0.1 | — | TMAH | 51.0 |
| T23$^e$ | | 90 | 0.125 | 0.051 | 0.200 | 0.1 | — | Sodium Aluminum Oxide | 6.4 |

$^a$reaction time increased from 1 hour to 3 hours
$^b$repeated
$^c$cooled gradually
$^d$KOH and KNO$_3$ added rapidly
$^e$CHM added dropwise into reaction vessel with KOH and KNO$_3$ Based on the results of Test IDs T7 through T9 (control tests in which no CHM was added and SEM analysis of the products was performed), magnetite crystals formed in this environment are spherical, ranging from 0.2-0.3 microns in diameter. As shown in Table 2, for the CHM screening tests in which a magnetite product (as determined from magnetic response and visible properties) was synthesized, no significant variation in crystal morphology was observed due to CHM addition at these temperatures.

It is noted that although Test 15 (boric acid) resulted in larger spherical crystals (0.5 μm), KOH and KNO3 were added rapidly (versus dropwise). This test was therefore repeated (Test 15A), yielding spherical crystals of approximately 0.3 μm.

The two organic phosphonate species tested (EDTP and HEDP) resulted in the formation of a non-magnetic product. In Test ID T16, the resulting product had a greenish-blue color; this observation, coupled with the high anion content of these tests, suggests that this material is a green rust. The inhibition of a magnetite product in the low-temperature screening experiments could be interpreted as a form of crystal habit modification.

It is thus observed that in low-temperature (about 90° C.), alkaline environments, decreasing the concentration of Fe$^{2+}$ results in the formation of spherical magnetite crystals. Under these conditions, the crystal morphology of magnetite appears to be unaffected by the addition of organic species (oxalate, formate, salicylate, tetramethylammonium hydroxide), boric acid, and sodium aluminum oxide. The addition of phosphonate species (EDTP, HEDP) resulted in the formation of an alternate chemical species. Although the habit that results from this low temperature testing is unlikely to be present at the higher temperatures (240-280° C.) of the steam generators (SGs) at full-power operation, low-temperature magnetite CHMs could potentially be used in some secondary side applications.

A CHM that could effectively reduce the size or density of magnetite crystals formed at low temperatures (i.e., in some regions of the feedwater and condensate systems), may increase the potential for corrosion product removal in a manner similar to dispersants, by increasing the amount of time the particles remain in suspension. This process could be applied during SG wet layup as a deposit conditioning agent, similar to Advanced Scale Conditioning Agent technology, but targeting deposit structure at the level of the crystal lattice, or as a method to control or prevent the formation of additional corrosion products in the event of oxygen ingress during wet layup.

Table 2.

Characteristics of Products from Magnetite Screening Tests at Low Temperatures (T=90° C.)

TABLE 2

Characteristics of Products from Magnetite Screening Tests at Low Temperatures (T = 90° C.)

| Test ID | Observation | pH* | Solid Mass (g) | Attraction to Magnet | XRD | IR | SEM |
|---|---|---|---|---|---|---|---|
| T1 | Black | 12.8 | 2.77 | strong | Magnetite | Magnetite | N/M |
| T2 | Black | 12.7 | 2.85 | strong | Magnetite | Magnetite | N/M |
| T3 | Black | 5.7 | 3.86558 | strong | Magnetite | Magnetite (impurity at 1120 cm$^{-1}$) | N/M |
| T4 | Black | 5.3 | 1.2546 | strong | Magnetite | Magnetite (impurity at 1120 cm$^{-1}$) | N/M |
| T5 | Black | 4.9 | 6.4614 | very little | Fe2O3 (green rust II) | Multiple peaks | N/M |
| T6 | Black | 6.3 | 0.4684 | strong | little magnetite | Magnetite (impurity at 1120 cm$^{-1}$) | N/M |
| T7 | Black | 6.0 | 0.2594 | strong | Magnetite | Magnetite (impurity at 1120 cm$^{-1}$) | N/M |
| T8 | Greenish blue | 4.4 | 0.7759 | weak | Magnetite (small amount) | No magnetite, other species | N/M |
| T7A | Black | 6.9 | 0.1811 | strong | Magnetite | Magnetite (impurity at 1120 cm$^{-1}$) | spherical ~0.2 μm |
| T8A | Black | 4.7 | 0.184 | strong | Magnetite | Magnetite (impurity at 1120 cm$^{-1}$) | spherical ~0.3 μm narrow distribution |
| T9 | Black | 3.7 | N/M | strong | Magnetite | Magnetite (impurity at 1120 cm$^{-1}$) | spherical ~0.2 μm |

TABLE 2-continued

Characteristics of Products from Magnetite Screening Tests at Low Temperatures (T = 90° C.)

| Test ID | Observation | pH* | Solid Mass (g) | Attraction to Magnet | XRD | IR | SEM |
|---|---|---|---|---|---|---|---|
| T9A | Black | 3.0 | N/M | strong | N/M | multiple peaks including magnetite | N/M |
| T8A#2 | Black | 3.6 | 0.1957 | strong | Magnetite | N/M | N/M |
| T10 | Black during rxn but orange the next day, not much precipitate | 4.3 | 0.3173 | very weak | N/M | N/M | flakes |
| T10A | Black during rxn but orange the next day, not much precipitate | 4.8 | 0.2245 | very weak | N/M | N/M | N/M |
| T11 | Black | 5.2 | N/M | strong | N/M | N/M | spherical 0.2-0.3 µm |
| T12 | Black | 5.2 | 0.1876 | strong | N/M | N/M | spherical 0.2-0.3 µm |
| T13 | Dark green | 5.0 | N/M | strong | Magnetite | N/M | N/M |
| T14 | Black | 4.8 | 0.1887 | strong | Magnetite | N/M | ~0.3 µm |
| T15 | Black, KOH + KNO3 added quickly | 4.3 | 0.1855 | strong | Magnetite | N/M | spherical ~0.5 µm |
| T16 | Greenish blue, small precipitate (white and black) | 4.9 | N/M | very weak | N/M | N/M | N/M |
| T17 | Black | 5.8 | 0.1978 | strong | N/M | N/M | irregular ~0.2-0.5 µm |
| T18 | After adding Na aluminum oxide, some precipitate | | N/M | strong | Magnetite | N/M | irregular ~0.2 µm |
| T15A | Black | 3.8 | 0.1937 | strong | Magnetite | N/M | spherical ~0.3 µm |
| T19 | Black | 3.7 | 0.2777 | strong | Magnetite | N/M | N/M |
| T20 | Black | 4.6 | 0.1849 | strong | N/M | N/M | ~0.2 µm |
| T21 | Black | 5.1 | N/M | strong | N/M | N/M | ~0.2 µm |
| T22 | Black | — | N/M | strong | N/M | N/M | ~0.2 µm |
| T23 | Black, paste like | — | N/M | moderate | N/M | N/M | No clear crystals |

N/M = Not Measured
pH of supernatant, measured at the conclusion of the heating period.

Crystal habit modifier screening tests were performed at an elevated temperature (250° C.) that is more representative of steam generator conditions. These experiments were based on a procedure described in Sapieszo, R. S., and E. Maiijević, "Preparation of Well-Defined Particles by Thermal Decomposition of Metal Chelates", Journal of Colloid and Interface Science, Vol. 74. No. 2, April 1980, pp. 405-422, incorporated by reference herein. Iron oxide in the form of magnetite has been consistently produced using this procedure (verified by magnetic sweeping).

The Sapieszko-Matijević method (SM Synthesis) uses $Fe_2(SO_4)_3$ as a starting material. The ferric sulfate solution was heated to 200-250° C. The secondary-system (CHM-magnetite) screening tests conducted are shown in Table 3. The results of the CHM magnetite screening tests conducted at 250° C. are shown in Table 4. In further experiments, reported in Table 5, the test solutions were preheated at 140° C. for a 12-16 hour period to achieve greater crystal uniformity.

The following candidate CHMs were screened for their ability to modify the crystal habit of magnetite at elevated temperatures (180-250° C.):
Sodium sulfate ($Na_2SO_4$)
Sodium chloride (NaCl)
Formic acid (HCOOH)
Sodium oxalate ($Na_2C_2O_4$)
Sodium salicylate ($NaC_2H_5O_3$)
Ethylenediaminetetraacetic acid-tetramethylammonium hydroxide (EDTA-TMAH)
Ethylenediamine tetraphosphonate (EDTP)
Sodium aluminum oxide ($NaAlO_2$)
Polyacrylic acid (PAA)
Titanium dioxide ($TiO_2$)
Zinc acetate ($Zn(CH_3CO_2)_2$)

A total of 10.2 g of iron(III) sulfate hydrate (equivalent to 7.997 g anhydrous iron(III) sulfate) were added to a 100 ml volume of deionized water to yield a 0.2 M $Fe_2(SO_4)_3$ solution. The solution was stirred and heated to 40° C. to dissolve the iron(III) sulfate hydrate, which was added in powder form. A 2 M stock solution of triethanolamine (TEA) was prepared by adding 26.54 ml TEA to 73.46 ml deionized water. The appropriate amount of 50/50 wt/wt % NaOH to yield a final concentration of 1.2 M was used in these experiments. A 0.85 M hydrazine hydrate ($N_2H_4.H_2O$) stock solution was prepared from a 35% solution. All reagents were laboratory reagent grade.

To prepare an equivalent 100 ml volume of test solution, 10 ml each of 0.2 M $Fe_2(SO_4)_3$ and 2 M TEA stock solutions were combined in an appropriately-sized Nalgene bottle equipped with a stir bar. 25 ml of deionized water was added to this mixture. To this mixture was added 9.6 g of 50/50 wt/wt % NaOH while stirring continuously. After the solution was thoroughly mixed to yield a clear solution, it was allowed to sit overnight at ambient temperatures.

To perform each test, 8.25 ml of the above solution was placed in a small container. 1.5 ml of the 8.5 M $N_2H_4$ stock solution was added to the solution. If a CHM was to be added, the desired amount of CHM was added to the small container at this point (either in powder form or dissolved in less than 5 ml deionized water). The resulting solution was brought to a final volume of 15 ml using deionized water, and transferred to a PFTE small autoclave liner (30 ml Parr bomb). This liner was enclosed in a 30 ml Parr sealed autoclave and heated as indicated in Tables 3-5. Following the heating period, each autoclave was quenched by immersion in room-temperature water. Once cool, the test solution was filtered through a 0.45 µm Millipore membrane to collect the resulting precipitate. The precipitate was washed three times with 5-10 ml deionized water to remove any remaining solution. The membranes with collected particles were placed in Petri dishes and dried under vacuum for SEM analysis.

TABLE 3

Test Matrix for Magnetite Screening Tests at High Temperature (T = 250° C.)

| Experiment ID | Oxide, Name, Reaction System | Reagent M+ (mL) | OH− (mL) | Other (mL) |
|---|---|---|---|---|
| 109 | Oxide: $Fe_3O_4$ | 1.50 $Fe_2(SO_4)_3$ | 1.50 50% NaOH | 1.50 8.5 M TEA |
| 112 | (Magnetite) | 1.50 $Fe_2(SO_4)_3$ | 1.50 50% NaOH | 1.50 8.5 M TEA |
| 113 | Reaction System | 1.50 $Fe_2(SO_4)_3$ | 1.50 50% NaOH | 1.50 8.5 M TEA |
| 114 | 20 mL Parr Bomb | 1.50 $Fe_2(SO_4)_3$ | 1.50 50% NaOH | 1.50 8.5 M TEA |
| 115 | | 1.50 $Fe_2(SO_4)_3$ | 1.50 50% NaOH | 1.50 8.5 M TEA |
| 116 | | 1.50 $Fe_2(SO_4)_3$ | 1.50 50% NaOH | 1.50 8.5 M TEA |
| 117 | | 1.50 $Fe_2(SO_4)_3$ | 1.50 50% NaOH | 1.50 8.5 M TEA |
| 118 | | 1.50 $Fe_2(SO_4)_3$ | 1.50 50% NaOH | 1.50 8.5 M TEA |
| 122 | | 1.50 $Fe_2(SO_4)_3$ | 1.50 50% NaOH | 1.50 8.5 M TEA |
| 123 | | 1.50 $Fe_2(SO_4)_3$ | 1.50 50% NaOH | 1.50 8.5 M TEA |
| 124 | | 1.50 $Fe_2(SO_4)_3$ | 1.50 50% NaOH | 1.50 8.5 M TEA |

| Experiment ID | Red/Ox | | CHM | T (° C.) |
|---|---|---|---|---|
| 109 | 1.50 mL | $N_2H_4$ (Red) | None | 250 |
| 112 | 1.50 mL | $N_2H_4$ (Red) | 0.50 M $Na_2SO_4$ | 250 |
| 113 | 1.50 mL | $N_2H_4$ (Red) | 1.00 M NaCl | 250 |
| 114 | 1.50 mL | $H_2O_2$ (Ox) | None | 250 |
| 115 | 1.50 mL | $N_2H_4$ (Red) | 0.01 M ED TP | 250 |
| 116 | 1.50 mL | $N_2H_4$ (Red) | 0.02 M $Na_2C_2O_4$ (Na oxalate) | 250 |
| 117 | 1.50 mL | $N_2H_4$ (Red) | 1.00 M $CH_2O_2$ (formic acid) | 250 |
| 118 | 1.50 mL | $N_2H_4$ (Red) | 0.02 M $NaC_6H_4(OH)CO_2$ (Na salicylate) | 250 |
| 122 | 1.50 mL | $N_2H_4$ (Red) | 0.02 M Boric acid | 250 |
| 123 | 1.50 mL | $N_2H_4$ (Red) | 0.01 M Sodium alumunum oxide | 250 |
| 124 | 1.50 mL | $N_2H_4$ (Red) | 0.02 M EDTA-TMAOH | 250 |

TABLE 4

Characteristics of Magnetite (SM Synthesis) in the Presence of a CHM (T = 250° C. for 4 hrs.)

| Experiment Sample ID* | CHM Compound | CHM Concentration | Size (μm) | truncated hexagonal bipyramid | acicular (rod-like) | octahedral | hexagonal & triangular platelets | Trapezoidal & triangular prisms | small irregular clusters |
|---|---|---|---|---|---|---|---|---|---|
| 122 | Boric Acid | 0.015 M | 4-12 μm | | | | x | | |
| 122 | | 0.01 M | 4-20 μm | X | | | x | | |
| 124 | EDTA-TMAH | 0.015 M | 6-12 μm | | | | x | | |
| 115 | EDTP | 0.01 M | 4-12 μm | X | | | x | | |
| 115 | | 0.01 M | 20-30; <1-6 μm | X | | | | x | x |
| 117 | Formic Acid | 1.00 M | 4-14 μm | | | x | x | | |
| 114 | Hydrogen Peroxide | 0.5 M | 2-12 μm | | | | x | | |
| 123 | Sodium aluminate | 0.0075 M | 5-18 μm | X | | | x | | |
| 123 | | 0.005 M | 6-16; <2; 4-8 μm | | | x | x | | x |
| 113 | Sodium chloride | 1.00 M | 30-40; 4-10 μm | X | | | x | | |
| 116 | sodium oxalate | 0.015 M | 1.5-10 μm | | | x | | | |
| 118 | Sodium salicylate | 0.015 M | 1.5-8 μm | | | x | | | |
| 118 | | 0.01 M | 4-12; <1 μm | | | | x | | x |
| 112 | Sodium sulfate | 1.00 M | 13058 μm | | | | x | | |

For the examples reported in Table 5, a preheating period (12 or 16 hours at 140° C.) was added prior to heating at the maximum temperature. This was done to increase crystal uniformity by slowing the initial reaction rate, causing the release of ionic species to proceed more slowly. This helps ensure that the critical level of supersaturation required for nucleation occurs only once; afterwards, if the rate that ionic species are taken up by existing nuclei equals or exceeds the rate of formation of the ionic species, no new nucleation will occur and all crystals should have roughly the same growth period. The maximum temperature was reduced to 200° C. to avoid organic species from the PTFE liners leaching into the test solution at temperatures above 250° C.

TABLE 5

Characteristics of Magnetite Synthesized per the Sapieszko-Matijević Method in the Presence of a CHM (T = 140° C. for 16 hrs, T = 200° C. for 4 hrs)

| | CHM | | | Crystal Properties* | | | | | |
|---|---|---|---|---|---|---|---|---|---|
| Example | Compound | Concentration | Size (μm) | truncated hexagonal bipyramid | acicular (rod-like) | octahedral | hexagonal & triangular platelets | Trapezoidal & triangular prisms | small irregular clusters |
| C130 | None | — | 10-18 μm | x | | | | | |
| 131 | EDTA-TMAH | 0.01 M | 10-15 (THB); 50-250 (acic); <4 μm | x | x | | | | x |
| 132 | | 0.01 M | 25-50 (THB); 50-120 (acic); 2-8 (oct); <4 μm | x | x | x | x | | x |
| 133 | EDTP | 0.01 M | 20-35; <5 μm | x | x | | | | x |
| 134 | | 0.1 M | 5-25 μm | x | | | x | | |
| 135 | Formic Acid | 0.01 M | 8-18 μm | | | x | | x | |
| 136 | | 0.1 M | 20-35; <3 μm | x | x | | x | | x |
| 137 | | 0.1 M | 4-8 (platelet); 25-35 (THB); 70-100 μm (acic) | x | x | | x | | x |
| 138 | | 0.01 M | 35-60 (THB); 100-200 (acic); <5 μm | x | x | | | | x |
| 139 | Sodium aluminate | 0.01 M | ~20 (THB); 50-100 (acic); <3 μm | x | x | | | | x |
| 140 | Sodium | 0.01 M | 16-30; <4 μm | x | | | | | x |
| 141 | chloride | 0.01 M | 25-35; <5 μm | x | | | | | x |
| 142 | | 0.1 M | 30-40; <5 μm | x | | | | | x |
| 143 | Sodium | 0.01 M | 18-25; <3 μm | x | | | | | x |
| 144 | oxalate | 0.05 M | 15-25; <2 μm | x | x | | | | x |
| 145 | | 0.01 M | 25-35 (THB); 70-100 (acic) μm | x | x | | | | x |
| 146 | | 0.05 M | 25-35 (THB); 4 μm | x | | | | | x |
| 147 | Sodium salicylate | 0.03 M | 10-25 (THB); 3-8 (platelet) μm | x | x | | | | x |
| 148 | Sodium sulfate | 0.1 M | 20; <4 μm | x | x | | | | x |
| C149 | None | — | 15-30 μm | x | | | | | x |
| 150 | PAA (4) | 10 ppm | 20-30 (THB); 3-6 (oct) μm | x | | x | | | |
| 151 | | 1000 ppm | 20-25 (THB); 4-14 μm | x | | x | x | x | |
| 152 | TiO$_2$ (Anatase) | 10 ppm | 5-20 μm | | | x | x | x | |
| 153 | | 1000 ppm | <4 μm | | | | | | x |
| 154 | Zinc acetate | 10 ppm | 20-30 (THB); 100-200 (acic); <10 μm | x | x | | | | x |
| 155 | | 1000 ppm | 15-30 (THB); 70-150 (acic); <8 μm | x | x | x | | | x |

(1) Solution was heated for 12 hrs at 140° C. 4 hrs at 170° C. then 1 hr at 250° C.

(2) Solution was heated for 16 hrs at 140° C. followed by heating for 4 hrs at 160° C. then 2 hrs at 200° C.

(3) The smaller clusters formed in this test were distinctly spinel.

(4) OptiSperse PWR6600 (a 10% PAA solution manufactured by GE Water & Process Technologies) was used in these tests. The concentration given as the amount of polymer (not OptiSperse) in the test solution.

(5) This sample contained a few irregular spheroids ~20 μm in diameter.

An octahedral habit was observed in experiments performed at 250° C. and without a preheating stage. This habit was also observed as a minority phase after the addition of a preheating stage to the procedure. The octahedral crystals ranged from 1-18 µm in size. A second type of crystal structure resembling a hexagonal bipyramid with truncated apexes (truncated hexagonal bipyramidal, THB) was observed in tests performed per the Sapieszko-Matijević method (200° C. or 250° C.). These crystals tended to be significantly larger than the octahedral crystals observed (up to 50 µm, compared to 1-18 µm for octahedral crystals).

The experiments incorporating an extended low temperature (140° C.) preheating period generally produced THB crystals, and was most consistently observed in tests conducted at a maximum temperature of 200° C. This preheating period was intended to simulate the formation of magnetite in low temperature areas of the condensate and feedwater systems prior to transport to the SGs. In some examples, long acicular crystals were also observed. The acicular crystals varied from 50 µm to over 250 µm in length, with aspect ratios (length to diameter) of between 20 and 40.

Thin, plate-like hexagonal and triangular crystals with high aspect ratios were observed in most samples containing THB crystals, and were observed independently in tests conducted at 250° C. without a preheating period. The platelet crystals were typically smaller (in terms of longest dimension) than the THB crystals, but slightly larger than the octahedral crystals.

Figure 4:
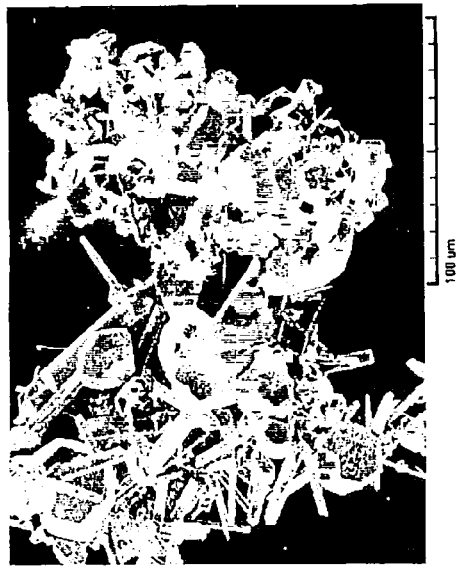
FIG. 4 is a photomicrograph of the crystal habit of magnetite (SM synthesis) modified by 0.01M EDTA-TMAH.
Figure 3:
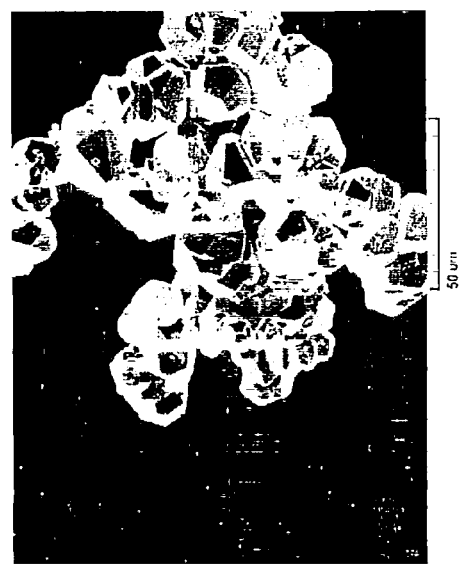
FIG. 3 is a photomicrograph of the crystal habit of magnetite synthesized by the Sapieszko-Matijevic (SM) method in the absence of a Crystal Habit Modifier(CHM).

A photomicrograph images of magnetite crystals formed in the presence of EDTA-TMAH (FIG. 4) is shown and compared with a control test conducted in parallel (FIG. 3, and Example C130). The presence of EDTA-TMAH promoted the formation of acicular crystals in both tests performed with a pre-heating period (Example 131 and 132). The presence of acicular crystals in a control test indicates that these crystals are magnetite and that other elemental species (C or N contributed by the CHM) were not incorporated to a significant extent. The frequency of platelet-like crystals increased with 0.01 M EDTA-TMAH in testing at both 250° C. (Example 124) and at 200° C. which tended to favor the formation of THB crystals. The platelet habit may be desirable due to the higher aspect ratio of these crystals.

Formic acid was shown to promote the formation of the acicular (rod-like) geometry in addition to the truncated hexagonal bipyramidal (TUB) geometry observed, which may be beneficial in secondary system deposits. The greater aspect ratios of these crystals may lead to greater deposit porosity and enhanced heat transfer. They may also be easier to remove due to having a smaller area to attach to tube surfaces.

Figure 6:
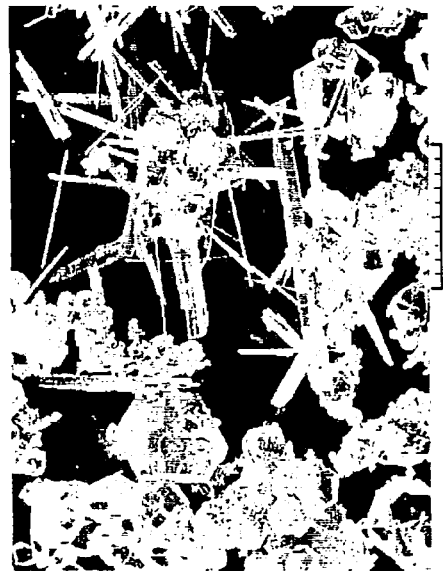
FIG. 6 is a photomicrograph of the crystal habit of magnetite (SM synthesis) modified by 0.01M formic acid.
Figure 5:
FIG. 5 is a photomicrograph of the crystal habit of magnetite (SM synthesis) modified by 0.1 formic acid.

The presence of formic acid at a concentration of 0.1 M also led to the observance of the platelet crystal habit in Example 137 as shown in FIG. 5, such that the presence of formic acid may enhance stabilization of the goethite crystal structure through the pre-heating period. No platelet crystals were observed in the parallel control test of Example C130 as shown in FIG. 3. In the tests that contained formic acid and included a pre-heating period acicular crystals were formed. The acicular habit occurred more frequently at higher concentrations of formic acid (0.1 M). At lower formic acid concentrations (0.01 M), greater variation in crystal habit was observed (Example 138 and FIG. 6). It is considered that the acicular magnetite habit will have a positive effect on deposit heat transfer characteristics, and would therefore be desirable.

OptiSperse PWR6600 is a polymeric dispersant formulation containing 10% polyacrylic acid (PAA) that may be added to the secondary system to promote the retention of iron in suspension. Previous testing of this chemical at a concentration of 1 ppm indicates that the presence of PAA does not affect the nature of the protective oxide layer over extended periods of time. PAA is currently qualified for long-term use in PWR SGs at concentrations up to 100 ppb (recommended maximum SG blowdown concentration): higher concentrations have been qualified for shorter, off-line applications.

Figure 8:
FIG. 8 is a photomicrograph of the crystal habit of magnetite (SM synthesis) modified by 1000 ppm polyacrylic acid.
Figure 10:
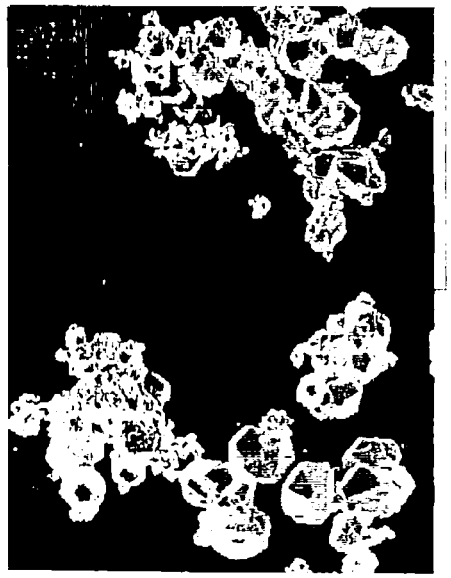
FIG. 10 is a photomicrograph of the crystal habit of magnetite (SM synthesis) modified by 10 ppm polyacrylic acid
Figure 7:
FIG. 7 is a photomicrograph of the crystal habit of magnetite (SM synthesis) in the absence of a CHM.
Figure 9:
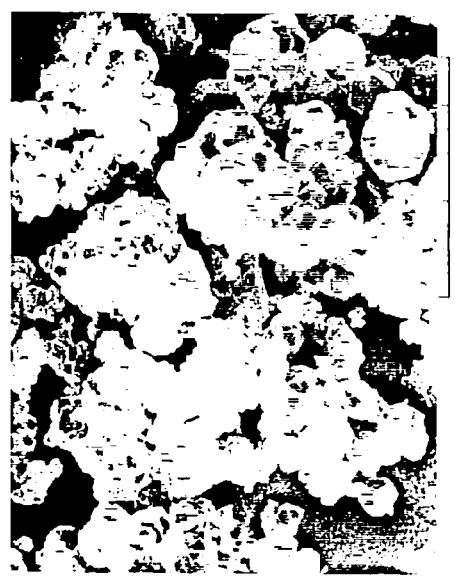
FIG. 9 is a photomicrograph of the crystal habit of magnetite (SM synthesis) in the absence of a CHM.

The effects of the dispersant at 10 ppm and 1000 ppm (given as ppm PAA, not total solution) on the formation of crystalline magnetite were evaluated as Examples 150 and 151, respectively. SEM images of the products of these tests shown in FIG. 8 (1000 ppm) and FIG. 10 (10 ppm) are compared with the products of the control Example C149 conducted in parallel, shown in FIGS. 7 and 9.

Acicular crystals were not formed in the presence of PAA. The addition of 10 ppm PAA to the test solution resulted in a trend towards decreased particle size and the formation of smaller octahedral crystals. At 1000 ppm, the frequency of small octahedral and platelet crystals relative to large THB crystals was further increased. Based upon observations of the products formed, PAA is likely to have one or more of the following effects on magnetite crystallization: PAA may slow the overall growth rate by sequestering iron and increasing the repulsive forces between iron species. PAA may increase the nucleation rate relative to the crystal growth rate, as indicated by the smaller average crystal size. The repulsive effect between particles with associated PAA is likely to increase with increasing crystal size: this would make interactions with larger particles less likely and would slow crystal growth in general. PAA may have a greater tendency to bind to the exposed surfaces of THB crystals, limiting their growth and allowing the formation of smaller crystals of alternative habits.

These results indicate that PAA at concentrations higher than those currently qualified or applied for dispersant uses may have a beneficial effect on the rate of crystalline magnetite formation in addition to its ability to increase iron removal from the secondary system through the blowdown at currently qualified or applied concentrations. Alternatively, PAA may promote the formation of more compact deposits by reducing the size of the corrosion product particles (magnetite) entering the generator. It should be noted that these experiments were performed with much higher concentrations of PAA compared to the concentrations typically present during online applications, by 3 orders of magnitude.

Titanium dioxide ($TiO_7$) has been proposed for use in PWRs in the past as a corrosion inhibitor in the secondary side system.

Figure 12:
FIG. 12 is a higher magnification photomicrograph of the crystal habit of magnetite (SM synthesis) modified by 10 ppm $TiO_2$ (Anatase).
Figure 14:
FIG. 14 is a higher magnification photomicrograph of the crystal habit of magnetite (SM synthesis) modified by 1000 ppm $TiO_2$ (Anatase).
Figure 11:
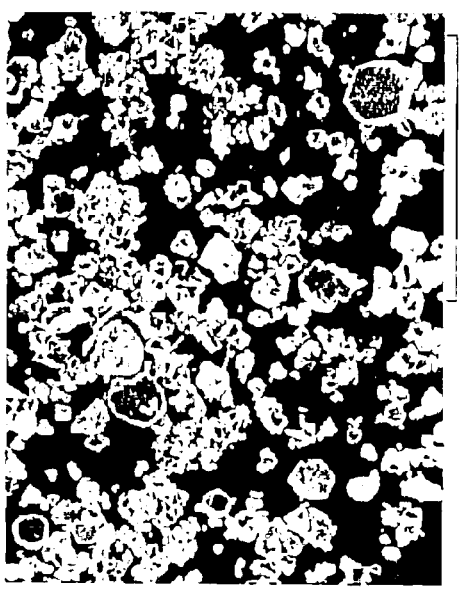
FIG. 11 is a photomicrograph of the crystal habit of magnetite (SM synthesis) modified by 10 ppm $TiO_2$ (Anatase).
Figure 13:
FIG. 13 is a photomicrograph of the crystal habit of magnetite (SM synthesis) modified by 1000 ppm $TiO_2$ (Anatase).

SEM images of the magnetite crystals formed in the presence of 10 ppm Ti added as $TiO_2$ in Example 152 (FIGS. 11 and 12) and 1000 ppm Ti added as $TiO_2$ in example 153 (FIGS. 13 and 14) are compared with the products of control Example C149 (FIGS. 7 and 9) conducted in parallel. The addition of $TiO_2$ at 10 ppm resulted in a reduction in the size and reduction in regularity and frequency of THB crystals, and an increase in the frequency of the octahedral crystal habit. $TiO_2$ may contribute to a more stable oxide by promoting the octahedral habit and/or increasing the uniformity of crystal size.

At 1000 ppm Ti (as $TiO_2$), the crystals formed were significantly smaller (generally 4 µm or less) and grouped together. Despite the small crystal size, the aggregates appeared relatively porous. The sharp appearance of the projected areas suggests that these crystals are predominantly octahedral or of a similar geometry, although some larger platelet crystals are also observed. Titanium dioxide may have a positive effect on the heat transfer properties of tube scale despite the potential for tighter packing that could arise from smaller crystals.

Boiling Condition Tests

The effect of crystal habit modifying materials on magnetite synthesis under boiling conditions was evaluated. The experimental apparatus consisted of a once-through flow-path constructed to promote deposition of a thin oxide layer covering the majority of the heat transfer surface, a ½ inch (1.27 cm) stainless steel tube about 6 ft (1.8 m) in length. The test chemistry for the feed solution was based on the Sapieszko-Matijević method (SM synthesis).

The SM synthesis process solution was added to a 2 L autoclave and preheated to 75° C. prior to the start of each test. Once the heating loop had reached a steady-state operating temperature, the test was initiated by opening the gate valve on the line exiting the autoclave, allowing the process solution to flow to a peristaltic pump. The solution was pumped through the shell-side of a tube-in-tube heat exchanger where it was heated to a saturation temperature of about 120° C. A back-pressure regulator on the shell-side outlet of the tube-in-tube heat exchanger was adjusted to maintain a pressure of 28 psia in the process loop (corresponding to a process solution saturation temperature of about 120° C.). The flow rate of the process pump was set to 60 ml/min, resulting in a total test duration (time for 1.5 L of process fluid to pass through the apparatus) of 25 minutes. The inlet and outlet process fluid and heating oil temperatures and the pressure in the process loop were monitored throughout each experiment.

The vapor exiting the regulator was condensed and collected, and analyzed for residual iron content using ICP. At the conclusion of each test, a sample of the condensed process fluid was taken for analysis. The process loop was then flushed with 1.5 L of deionized water (at a flow rate of 90 ml/min). Once the test apparatus (including heating loop) had cooled to ambient temperature, the tube-in-tube heat exchanger was disassembled and the inner tube was removed for analysis. Care was taken to minimize disturbance to the deposit layer on the outside of the tube.

After each test, the inner tube of the heat exchanger was removed and the outer diameter (OD) examined for deposit material. Each tube was cut into five consecutive sections (tube sections 1-5), and a small 1-inch (~2.5 cm) sample was cut from each of the middle three tube sections (tube sections 2-4), mounted in epoxy, and polished down such that a cross section of the deposit layer and tubing was visible. The three samples taken from each tube were examined by light microscopy and scanning electron microscopy (SEM) to determine the thickness, porosity and general morphology of the deposit layer.

All deposition tests resulted in deposition of an oxide layer on the surface of the inner tube of the tube-in-tube heat exchanger. A sample of the oxide layer scraped from each tube was tested for magnetic response. All sample oxides were magnetic, supporting the conclusion that the oxide formed consists of primarily magnetite ($Fe_3O_4$). The area of deposit coverage of each tube was estimated based on the length of tubing observed to have an oxide layer divided by the length of the heat transfer region of the tube in contact with the process solution.

Example C200

In the absence of a CHM material, distinct, thin crystals 2-4 μm in length, and less than 0.3 μm thick, were visible on the deposit-solution interface. The crystals resembled the platelet morphology observed in the high-temperature magnetite screening tests. Smaller, irregular crystals were visible underneath the outer platelet crystals, becoming more consolidated at the tube-deposit interface.

Example 201

The CHM formate was added (as formic acid) to the process solution to a concentration of 10,000 ppm. The resulting deposit material was 4-6 μm thick and highly uniform. The long, thin crystals that appeared, stacked perpendicular to the tube surface, may create space for large channels through the deposit material. Due to the large surface area available and well-distributed passages for steam to escape (steam chimneys), this structure may improve boiling efficiency.

The presence of formate may have a beneficial effect on the structure of deposits formed, due to the high surface area and high frequency of steam chimneys. It is considered likely that other short-chain organic acids chemically similar to formate (e.g., acetic acid, propionic acid) will have similar effects on deposit morphology.

Example 202

The effect of polyacrylic acid (PAA) on magnetite formation under the test conditions was evaluated at a PAA concentration of 2230 ppm. The PAA was added to the test solution as OptiSperse PWR6600, of GE Water & Process Technologies, which contains 10% polymer by mass (the concentration of OptiSperse PWR6600, was therefore 22300 ppm or 2.23%).

In general, these deposits were slightly thinner (about 3-3.5 μm thick) than the deposits formed with 10,000 ppm formate (Example 201), but appeared to be more consolidated. In two tube sections, the crystals did not extend through the entire thickness of the deposit. The total surface area containing deposit material was significantly less than that observed in the control test (Example C200). This indicated that PAA reduced the overall amount of material depositing, especially in the lower portion of the tube where super-saturation was limited. The lack of deposit material on the lower 2.5 ft (0.76 m) of the inner tube of the tube-in-tube heat exchanger was also observed. The maximum tube thickness observed in each section of the tube from this example was similar to that observed in the control test.

The addition of PAA was observed to have mixed effects. The deposits formed in the presence of PAA were generally more consolidated (less porous). However, a significant portion of the heat transfer surface was observed to have little or no deposit accumulation. In addition, the PAA decomposes to form organic acids and aliphatic compounds. As noted above, the presence of formate and other short-chain organic acids may have a beneficial effect on deposit structure, which would counteract the trend towards consolidation observed with PAA. It should be noted, that the concentrations of organic acids produced through the decomposition of PAA in conventional use would be small, due to the low concentration of PAA generally added during full-power operation (on the order of 1 ppb).

Example 203

The concentration of titanium dioxide in aqueous solutions is limited, generally less than 100 ppb. The deposition test was performed with 1000 ppm $TiO_2$. Although the material did not completely dissolve, a relatively stable suspension of particulates was formed (the solution appeared white and cloudy): this solution was judged sufficiently stable for testing. This solution was added to the autoclave for preheating immediately after preparation to minimize the opportunity for settling.

The structure of the deposit material on the tube surface was highly variable, containing regions of consolidated deposit material (tube section 2—the first midsection), thin platelet crystals with chimneys (tube section 3—the middle section), and thinner deposits (tube section 4—the last midsection). The weak magnetic response of this material indicated that a secondary species in addition to magnetite was present (potentially ilmenite, $FeTiO_3$ or other ferritic species).

The relative areas of tubing covered with deposits are shown in Table 6. The oxide layers formed in Examples C200-203 ranged from dark grey to black, and were easily distinguishable from the polished "clean" (deposit-free) tube surfaces. The tube pulled from Control Example C200 had greater deposit coverage compared to the other three tests.

TABLE 6

| Example | CHM Compound | PPM | % Area Covered By Deposits |
|---|---|---|---|
| C200 | None | 0 | 70-80% |
| 201 | Formic Acid | 10,000 | 60-70% |
| 202 | PAA | 2,230 | 40-50% |
| 203 | $TiO_2$ | 1,000 | 60-70% |

The deposit layer formed in Example 203 (CHM: $TiO_2$) appeared grey compared to the deposit layer formed in the control test of Example C200. The deposit layer formed in Example 202 (CHM: PAA) had a mottled, grainy appearance and was darker in color than the control sample.

Cross-sections of each tube were examined for deposit thickness and porosity. The maximum deposit thicknesses measured for the three samples cut from each tube are shown in Table 7.

TABLE 7

| Example | CHM Compound | PPM | Maximum Deposit Thickness | | |
|---|---|---|---|---|---|
| | | | 1 | 2 | 3 |
| C200 | None | 0 | 2.5 | 3.6 | 3.8 |
| 201 | Formic Acid | 10.000 | 5.8 | 4.1 | 4.6 |
| 202 | PAA | 2.230 | 3.0 | 3.6 | 4.1 |
| 203 | $TiO_2$ | 1.000 | 4.6 | 4.6 | 4.8 |

Primary Side

Experimentation was conducted to investigate the effect of CHMs on a typical primary side deposit material, nickel ferrite. Sample primary side deposits were prepared according to the procedure disclosed in Regazzoni, A., and E. Matijević. "Formation of Spherical Colloidal Nickel Ferrite Particles as Model Corrosion Products." *Corrosion*. Vol. 38, No. 4, April 1982. pp. 212-218, incorporated herein by reference.

A deaerated solution of 0.5 M $FeSO_4$ was mixed with a deaerated solution containing 2 M $KNO_3$, 0.5 M $Ni(NO_3)$, and deionized water. A deaerated solution of 0.5 M KOH was added to form a gel, and the mixture was allowed to stand for 4 hours at a temperature of 90° C. The concentration of nitrate ion in the final mixture was 0.2 M, and the concentration of iron(II) ion precipitated was 0.025 M. (It is assumed that the total initial amount of nickel is always precipitated as nickel hydroxide.) After aging, the product was usually found, according to this method, to contain some amount of Fe(OH), and $Ni(OH)_2$ in addition to nickel ferrite. The hydroxides of iron(II) and nickel were dissolved in a deaerated solution of 1 M $HNO_3$.

The most important synthetic variables are the initial ratio of nickel to iron(II) in the gel. $R_j=[Ni(OH)_2]/[Fe(OH)_2]$, and the excess concentration of the ferrous iron. $[Fe^{2+}]_{exc}= [FeSO_4]-\frac{1}{2}[KOH]+[Ni(NO_3)]$, or of hydroxide ion, $[OH^-]_{exc}=[KOH]-2[FeSO_4]-2[Ni(NO_3)]$. These variables determine the size of the nickel ferrite particles as well as the distribution of iron and of nickel between the supernatant solution and the gel throughout the aging at 90° C. and the corresponding chemical composition of the nickel ferrite particles during the aging time. According to Regazzoni and Matijević, depending on $R_j$ and $[Fe^{2+}]_{exc}$ or $[OH^-]_{exc}$, the diameter of the nickel ferrite particles will be between about 0.1 µm and slightly above 1.5 µm, and the Ni/Fe ratio in the particles, which rises during the aging process, will reach between about 0.04 and about 0.36 at the end of the aging process.

During the separation of the product, the supernatant and the nitric acid wash (40 mL each) were collected. These liquids were centrifuged to remove any solid particles and then analyzed by ICP-AES.

The following, refinements were made to this procedure in an effort to obtain a more uniform product with a desirable Ni:Fe ratio (1:2):

The heating vessel was changed from a jacketed glass reaction vessel (heated with water) to a 100 mL glass test tube (immersed in a 90° C. water bath) to promote more uniform heating and to allow stricter temperature control.

The length of deaeration of several reagent solutions was modified based on observations of oxidation in the test solution.

A sensitivity analysis was performed on the amount of excess base and iron:nickel ratios in solution. This was done to optimize the stoichiometry and size of the resulting product.

Two control samples were heated at 240° C. for 4 days in a sealed autoclave following the initial heating period at 90° C. This was done in an effort to increase crystal growth and to investigate what effect, if any, extended heating would have on nickel ferrite produced via this method.

Initial experiments using the Regazzoni-Matijević method (RM synthesis) in the absence of crystal habit modifying (CHM) additives indicated that crystalline precipitates undergoing sedimentation within a relatively short time (approximately 10 minutes) were obtained when the following four conditions were met:

$[NO_3^-]=0.20$ M.

$[Fe(OH)_2]=0.025$ M $[OH^-]_{exc}=0.02$ M:

$R_j=[Ni(OH)_2]/[Fe(OH)_2]=1.0$

These results informed the concentrations of reagents used in subsequent CHM screening tests. Optimization of the Regazzoni-Matijević method resulted in increased yields and increased nickel-iron ratios in later trials. Once consistent yields and nickel-iron ratios had been obtained (about 90% metal recovery in control samples, and Ni:Fe ratios of 0.8-1), tests were performed with the addition of primary-side CHM candidates. Because nickel is only substituted for the octahedrally coordinated iron in the 2+ oxidation state, a nickel:iron ratio of greater than 0.5 indicates that other nickel species were also present (NiO, metallic nickel, etc.). The products of these experiments were characterized by FE-SEM to determine the effect of the CHM on the particle morphology. In some instances, EDS analysis was simultaneously performed to determine whether the CHM material had been incorporated into the solid.

The effects of introducing potential crystal habit modifiers on nickel ferrite powders produced according to the Regazzoni-Matijević method were explored, including boric acid ($H_3BO_3$), lithium hydroxide (LiOH), oxalic acid $(COON)_2$, zinc acetate $(Zn(OAc)_2)$, ammonium acetate ($NH_4OAc$), chromium nitrate ($Cr(NO_3)_3$), chromium acetate ($Cr_3(OH)_2(OAc)_7$), and lithium silicate ($Li_4SiO_4$).

The crystal habits of selected samples produced using the Regazzoni-Matijević method were examined using field emission scanning electron microscopy (FE-SEM) in order to obtain sufficient resolution. Energy dispersive spectroscopy (EDS) and x-ray diffraction spectroscopy (XRD) were utilized to gain information about the composition of some samples.

Example C300

Control Test (No CHM)

Figure 15:
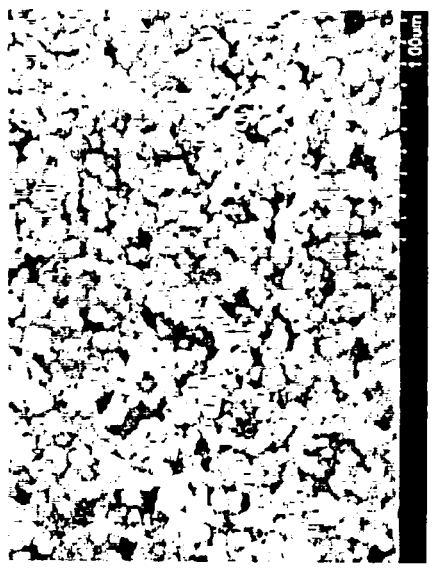
FIG. 15 is a photomicrograph of the crystal habit of nickel ferrite (RM synthesis) corresponding to primary side deposits in the absence of a CHM.

Uniform, well-defined crystals were produced, having a particle size of 50-80 nm, exhibiting a low aspect ratio, being roughly spherical in shape as shown in FIG. 15. These crystals may have had an underlying octahedral geometry. The distinct, separate crystals may lead to increased porosity of the sample. However, the shape of the crystals (spherical) also allows for relatively tight packing. The nickel:iron ratio of the product was 0.78, determined by mass balance.

Example 301

CHM of Chromium Acetate

The sample product contained predominantly round crystals, some of which were bacilli-shaped. Overall, the product was more irregular than the control sample Crystal particle sizes for the spherical crystals were 40-80 nm; crystal particle sizes for the bacilli-shaped crystals were about 150 nm by 50 nm, with occasional larger (perhaps hexagonal plate) crystals of 150-200 nm.

Figure 16:
FIG. 16 is a photomicrograph of the crystal habit of nickel ferrite (RM synthesis) modified by chromium acetate.

The low aspect ratio of the spherical crystals, and slightly wider size distribution of this sample enables closer packing. Irregularity in crystal packing resulted in greater porosity in some regions of the product; however, a cement-like, habitless coating on the particles resulted in decreased porosity in some areas. FE-SEM images of the product formed in the presence of chromium acetate are shown in FIG. 16.

The sample contained only 0.85 atomic % Cr (Cr:Fe=1:42), indicating that the majority of the Cr added was not incorporated into the crystal structure. The nickel content was also very low; the sample had a nickel-to-iron ratio of 1:18 (nickel constituted 5.5 atomic % of the sample on a metals basis). The carbon content of this product sample was 3.5 atomic %. Based on the ratios of metal species present, this product was predominantly magnetite; neither chromium nor nickel was substantially incorporated into the product. The larger particle size observed in this sample was likely the result of the reduced incorporation of other metals (Ni, Cr) in the sample.

Example 302

CHM of Zinc Acetate

Figure 17:
FIG. 17 is a photomicrograph of the crystal habit of nickel ferrite (RM synthesis) modified by zinc acetate.

The sample product contained continuous phase material with embedded spheres: no individual crystals were observed. The product appeared primarily amorphous, although it contained spherical protrusions roughly 50-80 nm in diameter. Wider, more streamlined pores were observed compared to control example C300 product. The morphology of the crystals is shown in FIG. 17. The altered pore structure, namely wide, tunnel-like pores with smooth walls, rather than narrow crevices between spherical crystals, may improve the rate at which steam may escape from the surface, improving overall heat transfer.

EDS analysis performed on the product of the zinc acetate CHM modified synthesis indicated metal ratios of Zn:Fe and Ni:Fe of 47 and 0.30, respectively. These ratios indicated that nickel and/or zinc were present as materials other than nickel ferrite. Carbon was a significant sample constituent (4.09 atomic %), similar to the level observed in the chromium acetate CHM modified sample.

Crystal habit modification may mitigate both the axial offset anomaly on the primary side and heat transfer fouling on the secondary side. It may either form a deposit with a desirable structure, or produce a weaker deposit that can be more readily spalled (or cleaned) from the tubing or the fuel. On the primary side, a crud deposit with a particular porosity and specific surface area may limit the concentration of boron compounds within the deposit that are subsequently adsorbed on the deposit matrix to form a borated solid, such as bonaccordite. On the secondary side, a more porous deposit facilitates liquid ingress so that adequate heat transfer can be maintained.

A process is therefore provided for modifying the habit of crud or corrosion product deposits on nuclear power reactor primary circuit or secondary circuit surfaces comprising introducing into water circulating through the primary circuit or secondary circuit at least one crystal habit modifier capable of interacting, at the temperature and pressure within the respective primary circuit or secondary circuit, with crud or corrosion product deposit components, or crud or corrosion product deposit precursors, in an amount sufficient to slow, alter, or inhibit crud or corrosion product crystal growth.

In certain embodiments, said interacting comprises at least one of:
a) Changing the habit of deposit crystals during particulate growth in the fluid phase prior to particulate deposition;
b) Changing the habit of crystalline deposits that form from dissolved species or colloidal particulates at heat transfer or non-heat transfer surfaces;
c) Changing the habit of an existing deposit as the existing deposit ripens due to partial release, internal densification, solubilization and/or re-deposition;
d) Changing porosity, specific surface area, or concentration of active adsorption sites for ionic species;
e) Reducing or increasing deposit crystal surface structure so as to change an activation energy or energy of adsorption of ionic species;
f) Changing deposit component or deposit precursor net particle charge or potential, to affect the deposition, agglomeration, or release of the deposit component or deposit precursor particulates;
g) Changing deposit crystal growth rate;
h) Changing deposit susceptibility to removal by chemical or mechanical means through tailoring the crystal habit; or i) Changing deposit chemical composition by adding a crystal habit modifier that promotes formation of at least one species as compared to a species formed in the absence of the crystal habit modifier.

The process may comprise adding a crystal habit modifier capable of changing the concentration of species that dictate crystal habit.

The process may also comprise adding a crystal habit modifier and a deposit precursor or deposit template that interacts with the crystal habit.

The process may further comprise adding a crystal habit modifier capable of adsorbing onto the deposit crystal surface to change the average binding force between particles in the surface layer.

The process may comprise adding a crystal habit modifier capable of interfering with at least one of the formation of deposit crystal nuclei or with the growth of the nuclei.

In certain embodiments, the process may comprise adding a crystal habit modifier capable of at least one of blocking addition of molecules to deposit crystal faces, reducing the growth rates of the deposit crystal faces, or changing morphology of growing deposit crystal faces.

Also, in certain embodiments the process may comprise adding a crystal habit modifier capable of at least one of controlling particle surface area, varying electrostatic charge density on the surface of particles, inducing changes of particle/solution interfacial tension, decreasing particle surface energy, producing deposits with high friability or altered porosity, or varying pH or potential within existing primary side or secondary side chemistry specifications.

The process for modifying crystal habit is not limited to the specific embodiments described above, but includes variations, modifications, and equivalent embodiments defined by the following claims. It should be understood that the embodiments described above are not only in the alternative, but can be combined.

We claim:

1. A process for modifying the habit of crud or corrosion product deposits on nuclear power reactor primary circuit or secondary circuit surfaces comprising introducing into water circulating through the primary circuit or secondary circuit at least one crystal habit modifier which interacts, at the temperature and pressure within the respective primary circuit or secondary circuit, with crud or corrosion product deposit components, or crud or corrosion product deposit precursors, in an amount sufficient to slow, alter, or inhibit crud or corrosion product crystal growth, optionally comprising modifying the crystal habit of nickel ferrite or magnetite, wherein the crystal habit modifier comprises at least one of (1) titanium dioxide, (2) a phosphate or phosphonates, (3) an acrylate, (4) a trivalent cation, optionally Al3+ or Mn3+, (5) a borate, (6) polyacrylic acid, (7) cerium acetate, (8) potassium, (9) maleic acid, (10) an aluminate, (11) a silicate, or (12) a nickel species.

2. A process for modifying the habit of crud or corrosion product deposits on nuclear power reactor secondary circuit surfaces comprising introducing into water circulating through the secondary circuit at least one crystal habit modifier which interacts, at the temperature and pressure within the secondary circuit, with crud or corrosion product deposit components, or crud or corrosion product deposit precursors, in an amount sufficient to slow, alter, or inhibit crud or corrosion product crystal growth, optionally comprising modifying the crystal habit of nickel ferrite or magnetite, wherein the crystal habit modifier comprises at least one of:
HEDP phosphonate, sodium oxalate, acetic acid, formic acid, propionic acid, sodium salicylate, boric acid, ethylenediamine tetraphosphonate (EDTP), ethylenediaminetetraacetic acid-tetramethylammonium hydroxide (EDTA-TMAH), polyacrylic acid (PAA), titanium dioxide, zinc acetate, sodium aluminum oxide, sodium chloride, sodium sulfate, or hydrogen peroxide.

3. A process for modifying the habit of crud or corrosion product deposits on nuclear power reactor primary circuit surfaces comprising introducing into water circulating through the primary circuit at least one crystal habit modifier which interacts, at the temperature and pressure within the primary circuit, with crud or corrosion product deposit components, or crud or corrosion product deposit precursors, in an amount sufficient to slow, alter, or inhibit crud or corrosion product crystal growth, optionally comprising modifying the crystal habit of nickel ferrite, wherein the crystal habit modifier comprises at least one of: boric acid, lithium hydroxide, oxalic acid, zinc acetate, ammonium acetate, chromium nitrate, chromium acetate, titanium dioxide, or lithium silicate.

4. A process for modifying the habit of crud or corrosion product deposits on nuclear power reactor secondary circuit surfaces comprising introducing into water circulating through the secondary circuit at least one crystal habit modifier which interacts, at the temperature and pressure within the secondary circuit, with crud or corrosion product deposit components, or crud or corrosion product deposit precursors, in an amount sufficient to slow, alter, or inhibit crud or corrosion product crystal growth, optionally comprising modifying the crystal habit of nickel ferrite or magnetite, wherein the crystal habit modifier comprises at least one of:
formic acid, ethylenediaminetetraacetic acid-tetramethylammonium hydroxide (EDTA-TMAH), or polyacrylic acid (PAA), or titanium dioxide.

5. The process of claim 4, wherein the crystal habit modifier is introduced at a concentration of at least about 10 ppm.

6. A process for modifying the habit of crud or corrosion product deposits on nuclear power reactor primary circuit surfaces comprising introducing into water circulating through the primary circuit at least one crystal habit modifier which interacts, at the temperature and pressure within the primary circuit, with crud or corrosion product deposit components, or crud or corrosion product deposit precursors, in an amount sufficient to slow, alter, or inhibit crud or corrosion product crystal growth, optionally comprising modifying the crystal habit of nickel ferrite, wherein the crystal habit modifier comprises at least one of formic acid, or polyacrylic acid (PAA), or titanium dioxide.

7. The process of claim 6, wherein the crystal habit modifier is introduced at a concentration of at least about 1000 ppm.

8. A process for modifying the habit of crud or corrosion product deposits on nuclear power reactor primary circuit or secondary circuit surfaces comprising introducing into water circulating through the primary circuit or secondary circuit at least one crystal habit modifier which interacts, at the temperature and pressure within the respective primary circuit or secondary circuit, with crud or corrosion product deposit components, or crud or corrosion product deposit precursors, in an amount sufficient to slow, alter, or inhibit crud or corrosion product crystal growth, comprising adding a crystal habit modifier and a deposit precursor or deposit template that interacts with the crystal habit.

9. A process for modifying the habit of crud or corrosion product deposits on nuclear power reactor primary circuit or secondary circuit surfaces comprising introducing into water circulating through the primary circuit or secondary circuit at least one crystal habit modifier which interacts, at the temperature and pressure within the respective primary circuit or secondary circuit, with crud or corrosion product deposit components, or crud or corrosion product deposit precursors, in an amount sufficient to slow, alter, or inhibit crud or corrosion product crystal growth, comprising adding a crystal habit modifier capable of adsorbing onto the deposit crystal surface to change the average binding force between particles in the surface layer.

10. A process for modifying the habit of crud or corrosion product deposits on nuclear power reactor primary circuit or secondary circuit surfaces comprising introducing into water circulating through the primary circuit or secondary circuit at least one crystal habit modifier which interacts, at the temperature and pressure within the respective primary circuit or secondary circuit, with crud or corrosion product deposit components, or crud or corrosion product deposit precursors, in an amount sufficient to slow, alter, or inhibit crud or corrosion product crystal growth, comprising adding a crystal habit modifier capable of interfering with at least one of the formation of deposit crystal nuclei or with the growth of the nuclei.

11. A process for modifying the habit of crud or corrosion product deposits on nuclear power reactor primary circuit or secondary circuit surfaces comprising introducing into water circulating through the primary circuit or secondary circuit at least one crystal habit modifier which interacts, at the temperature and pressure within the respective primary circuit or secondary circuit, with crud or corrosion product deposit components, or crud or corrosion product deposit precursors, in an amount sufficient to slow, alter, or inhibit crud or corrosion product crystal growth, comprising adding a crystal habit modifier capable of at least one of:
   blocking addition of molecules to deposit crystal faces,
   reducing the growth rates of the deposit crystal faces, or
   changing morphology of growing deposit crystal faces.

12. A process for modifying the habit of crud or corrosion product deposits on nuclear power reactor primary circuit or secondary circuit surfaces comprising introducing into water circulating through the primary circuit or secondary circuit at least one crystal habit modifier which interacts, at the temperature and pressure within the respective primary circuit or secondary circuit, with crud or corrosion product deposit components, or crud or corrosion product deposit precursors, in an amount sufficient to slow, alter, or inhibit crud or corrosion product crystal growth, comprising adding a crystal habit modifier capable of at least one of:
   controlling particle surface area,
   varying electrostatic charge density on the surface of particles,
   inducing changes of particle/solution interfacial tension,
   decreasing particle surface energy,
   producing deposits with high friability or altered porosity, or
   varying pH or potential within existing primary side or secondary side chemistry specifications.

13. The process according to any one of claims 1, 2, 3, 4, 6, 8, 9, 10, 11, or 12, wherein said interacting comprises at least one of:
   a) Effecting at least one of: partial release, internal densification, or solubilization and re-deposition of an existing deposit as the existing deposit ripens;
   b) Changing porosity, specific surface area, or concentration of active adsorption sites for ionic species;
   c) Reducing or increasing deposit crystal surface structure so as to change an activation energy or energy of adsorption of ionic species;
   d) Changing deposit component or deposit precursor net particle charge or potential, to affect the deposition, agglomeration, or release of the deposit component or deposit precursor particulates;
   e) Changing deposit crystal growth rate;
   f) Changing deposit susceptibility to removal by chemical or mechanical means through tailoring the crystal habit; or
   g) Changing deposit chemical composition by adding a crystal habit modifier that promotes formation of at least one species as compared to a species formed in the absence of the crystal habit modifier.

\* \* \* \* \*